Nov. 22, 1938.  C. R. NEESON  2,137,965
COMPRESSOR
Filed May 29, 1937
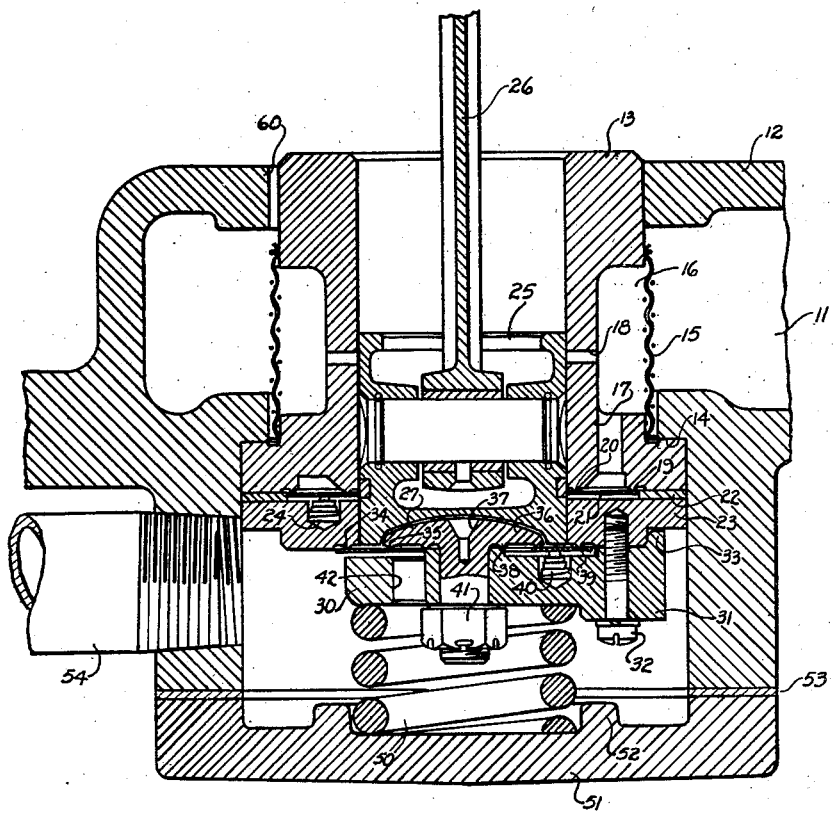
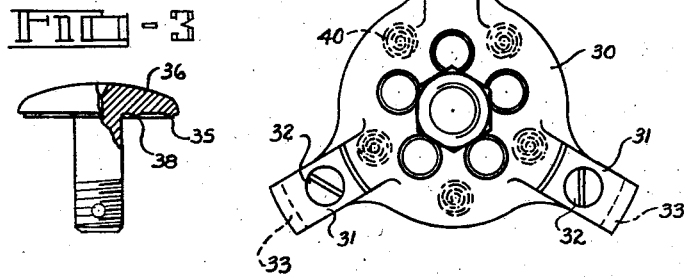
INVENTOR
CHARLES R. NEESON
BY
ATTORNEY Patented Nov. 22, 1938

2,137,965

UNITED STATES PATENT OFFICE 2,137,965

COMPRESSOR

Charles R. Neeson, Dayton, Ohio, assignor, by mesne assignments, to Chrysler Corporation, Highland Park, Mich., a corporation of Delaware Application May 29, 1937, Serial No. 145,589

1 Claim. (Cl. 230—230)

My present invention relates to an improvement in compressors, whether the compressor be used as an air compressor, or a refrigerant compressor, or for other purposes. The particular field with which the invention is at present associated is the air conditioning industry, but as is well known the same compressor may be used for other purposes.

The object of my invention is to improve the valve and piston assembly of a compressor in order to make the same more compact, more efficient, more economical, of longer life and easier to assemble. Various advantages of my invention will be apparent from the following description taken in connection with the accompanying drawing, wherein Fig. 1 discloses a portion of a compressor, the said portion consisting of part of the compressor casing showing the suction and discharge passages and a single valve and piston assembly, Fig. 2 discloses a portion of the assembly, and Fig. 3 discloses details of a part of the assembly.

Fig. 1 shows, by way of illustration, my invention associated with a piston situated vertically below its driving shaft as distinguished from ordinary construction wherein the piston operates vertically above its driving shaft. It is to be appreciated that an object of my invention is to design a piston and valve assembly which will operate as efficiently in one position as in another, which is to say that the piston may operate in a horizontal plane, in a vertical plane, or in any plane. By reason of having obtained this object of my invention I am able to build compressors of the radial, multi-cylinder type having for example, 3, 5 or 7 cylinders, which compressors may be positioned so that the cylinders extend radially in any plane. In the present illustration the cylinder is shown as the bottom cylinder of a machine having a horizontal shaft.

The numeral 10 refers to a portion of the compressor casing within which is a suction passage 11 defined by the compressor casing and an integrally cast portion 12. A sleeve 13 is inserted through openings in the portion 12 and casing 10, the sleeve forming the cylinder wall. The surfaces between the adjacent faces of portion 12 and sleeve 13 need not be leak-proof, and grooves 60 may even be provided so as to permit communication between the suction passage and the interior of the casing for a purpose more fully explained in my copending application, Serial No. 145,587, filed concurrently herewith. The casing 10 is provided with a shoulder 14 against which bears a shoulder on the sleeve 13, the matching faces thereof being perfectly machined so as to prevent the escape of gas. The opening in casing 10 is large enough to permit the insertion of the sleeve 13 with a screen 15 mounted thereon surrounding the body of the sleeve. The screen 15 is of fine mesh and is designed to prevent the entrance of scale or other foreign matter into the valve assembly, each cylinder being thereby provided with an individual screen or sieve. The screen 15 surrounds an annular groove 16 of substantial dimensions cut into the sleeve 13 and communicating with suction passages 17 extending through the sleeve 13 parallel to the axis of the cylinder, one such passage 17 being shown and others (not shown) being spaced about the body of the sleeve. The groove 16 also communicates with a plurality of supercharging suction ports 18 extending through the body of the sleeve so located as to be entirely covered by the piston at all times except at the end of its retracting or suction stroke. The passages 17 communicate with a shallow, annular groove extending around the end face of sleeve 13, said groove being bounded by concentric valve seats 19 and 20. It is appreciated from the drawing that the end face of sleeve 13 is recessed slightly at each side of the valve seats, so that the recesses may be formed in a roughfinished sleeve and the entire end surface of the sleeve ground and lapped whereby to facilitate the formation of regular valve seats, lying exactly in the same plane. The valve seats are covered by an annular suction valve 21 consisting of a thin plate of specially tempered steel, particular preference being given to the type of steel used in making large band saws. The valve may therefore flex slightly without breaking, but possesses inherent rigidity such that flexure should not occur under normal circumstances. The valve is located by a locating ring 22 having an outside diameter equal to the outside diameter of sleeve 13 and an inside diameter slightly larger than the diameter of the valve 21, the purpose of the locating ring 22 being to prevent the valve from engaging the piston and to define the limit to which the suction valve may be lifted from seats 19 and 20. The locating ring 22 is held against the end face of sleeve 13 by a member 23 of a discharge valve assembly, said member 23 having exactly the same external and internal diameters as the adjacent portion of sleeve 13 whereby to form therewith a continuation of the cylinder space. Springs 24 of the spiral flat strip type are supported in pockets in the face of member 23 and tend to keep the suction valve 21 against seats 19 and 20. The springs 24 need not be very strong since, as will presently appear, most of the work of opening and closing the valve is performed by the gas itself.

The piston 25 and piston rod 26 are of usual construction except for the provision of a concave recess 27 in the end face of the piston. Member 23 is attached to and locates a spider 30 consisting of a body from which extend spaced radial arms 31 having overhanging locating portions 33 snugly fitting a reduced portion of member 23. By accurately machining the member 23 and locating portions 33, accurate axial location of the discharge valve assembly is easily obtained. Member 23 and spider 30 are held together by bolts 32 extending through the arms 31. The outer surface of member 23 is provided with a concentric valve seat 34 formed by recessing the surface of the member. By constructing the valve seat in this fashion it is possible to define a true seat since the recesses may be formed in the rough-finished piece, while the surface of the member bearing against ring 22 and the outer surface of the member provided with the valve seat 34 may be finished and lapped at the same time to provide exactly parallel faces. A similar concentric valve seat 35 is provided on a mushroom member 36 having the inner surface of its head conforming to the concavity 27 in piston 25. The mushroom member is provided with a parallel, concentric locating seat 38, the valve seat 35 and locating seat 38 being formed by recessing the outer face of the member whereby the locating seat and valve seat may be ground and lapped at the same time. An annular discharge valve 39 rests against valve seats 34 and 35 and is engaged by springs 40, the discharge valve 39 and springs 40 being similar to suction valve 21 and springs 24, the discharge valve, however, having its diameters such that the valve extends inwardly over the end of the piston 25. The stem of the mushroom member 36 is accurately machined and extends through an accurately bored opening in spider 30, the two being held together by a nut 41. The face of the spider 30 is provided with a recessed portion limiting the movement of discharge valve 39, the recessed portion being surrounded by a raised portion bearing against member 23 and a raised inner portion against which bears locating seat 38, it being apparent that the two raised portions may be ground and lapped at the same time to define accurately parallel surfaces whereby to locate valve seats 34 and 35.

The discharge valve assembly is formed by placing springs 40 in their sockets, resting the discharge valve on the ends of the springs, and then bringing the mushroom member 36 and member 23 to bear on top of the valve and joining the whole by nut 41 and bolts 32.

In assemblying the compressor, the piston 25 is assembled with the remainder of the compressor, and then sleeve 13 is inserted to surround the piston. It is apparent that as soon as the sleeve and piston are in position no parts of the valve assembly can be dropped into the compressor since the only passage-way is through the passages 17 which are preferably of smaller diameter than the smallest dimension of springs 24. The locating ring 22 and valve 19 may now be placed and held in position by light grease or oil, or they may be held against the face of member 23 in some cases, especially when the cylinder is located as shown in Fig. 1. Springs 24 may be held in their sockets by light grease or oil, and can cause no trouble since the sockets are preferably designed snugly to receive the outer coils of the springs. The remainder of the assembly, comprising parts 23, 30, 36, 39 and 40 are locked together by bolts 32 and nut 41 so that regardless of the position of the cylinder the entire discharge valve assembly may be inserted as a whole, care being only necessary to prevent accidental displacement of springs 24. After inserting the discharge valve assembly a safety spring 50 is placed upon the body of the spider 30, and a cap 51 provided with a spring seat 52 is brought to bear against the outer end of the safety spring 50. A gasket 53 is provided against which the cap is tightened by means of bolts (not shown). The space surrounding the spider 30 defines a discharge passage with which communicates a discharge pipe 54.

It is apparent to those skilled in the art that the utmost efficiency is obtained by my construction since the clearance space at the end of the compression stroke of the piston 25 is reduced to an absolute minimum, there being substantially only sufficient clearance to prevent contact between the moving and stationary parts. As is well-known in the art, prior construction could not obtain high efficiencies since more clearance was necessary in order to prevent damage to the machine in case of the trapping of a slug of oil or liquid between the end of the piston and the head of the cylinder. Gas compressed by the piston would be retained in this clearance pocket and would re-expand into the cylinder on the suction stroke, reducing the effectiveness of the compressor. By the use of the mushroom head which as shown in Fig. 1 matches the concavity 27 in the end of the piston, I am able to reduce this clearance space to an absolute minimum since any trapped slugs of oil or liquid will normally be flattened and blown out through the discharge valve. The mushroom head 36 is provided with a slot 37 by means of which it may be held while tightening nut 41, and the spider 30 is provided with openings 42 for increasing the passage area into the discharge space.

The piston and valve assembly is shown at the instant the piston commences to retract on the suction stroke. Due to expansion of the minute quantity of compressed gas remaining in the clearance space the pressure on the outside of discharge valve 39 is sufficient to overcome the internal pressure and, aided by the springs 40, has reseated the discharge valve 39. Continued retraction of piston 25 results in the creation of rarified gas within the cylinder to such an extent that the internal pressure will be less than the suction pressure existing in passages 17, whereupon valve 21 will be lifted from its seat. Continued movement of the piston draws gas into the cylinder and the final retraction of the piston uncovers ports 18 through which more gas may be drawn into the cylinder. At the speeds which I am able to obtain, such as 1750 R. P. M., it is quite conceivable that less gas would be drawn into a cylinder than should be the case if pressures could balance, this possible loss of efficiency being prevented however by uncovering the large number of ports 18 through which gas at suction pressure can rush in case the gas within the cylinder is at a lesser pressure. Upon starting the return stroke ports 18 are immediately covered so that practically all of the stroke of the piston can be utilized for compression. The springs 24 and the slightly compressed cylinder gas soon overcome the suction pressure and re-seat valve 21. As soon as the piston has traveled outwardly far enough to compress the cylinder gas to a pressure greater than the pressure existing in the discharge space, valve 39 will be lifted from its seat and gas discharged from the compressor. It is estimated that at 1750 R. P. M. the suction and discharge valves are raised or lowered in one four hundred and fiftieth of a second, which is only possible with my construction and which therefore permits full efficiency to be realized.

A feature of my invention of great importance to its successful and fool-proof operation is provided by the discharge valve assembly and locating ring 22 surrounding the suction valve. It occasionally happens that excess liquid will be returned to the compressor, which would result in damage, possibly causing a serious explosion, were it not that the safety spring permits the discharge valve assembly to rise and relieve the internal pressure. It is to be noted that the member 23 is provided with a cylindrical surface fitting the surface of the opening through casing 10 which acts as a locating surface assuring accurate return of the valve assembly if thus lifted as a whole. In certain prior constructions returned liquid was caused to reenter the suction passages under discharge pressure, thus preventing evaporation in the low-pressure side of the refrigerating equipment and impairing efficiency of the same. In my improvement the returned liquid is trapped within the cylinder space due to the close fit between the outer surface of member 23 and the surface of the casting, and between the inner surface of member 23 and the side of the piston. If any small amount of gas under discharge pressure does leak back it will only serve more firmly to hold the suction valve on its seats, the valve, due to the locating ring 22, being also held in concentric, axial location. The trapped liquid raises the discharge valve assembly, which is reseated as soon as the piston retracts a sufficient distance, reexpands into the cylinder space, and is compressed into the discharge space. If sufficient liquid is present to maintain a higher pressure than the suction pressure, valve 21 will remain seated without harm to the machine or loss of efficiency.

Having described the preferred form of my invention, it is to be appreciated that various changes and modifications in shape and form may be made without departing from the scope of my invention as defined by the following claim.

I claim:

In a compressor having discharge and suction passages and a piston, the combination of a cylindrical sleeve fitting an opening in the compressor and forming a part of the cylinder in which the piston operates, said sleeve being provided with suction ports through which gas may enter the cylinder space and having an end face provided with a suction valve seat beyond which the piston travels at the end of its compression stroke, an annular suction valve seated upon said valve seat, an annular locating ring concentrically surrounding said suction valve and having greater thickness than said suction valve, a discharge valve assembly comprising a movable safety head carrying a discharge valve, said safety head including a portion bearing against said locating ring whereby to limit the extent of movement of said suction valve, said portion snugly fitting the compressor at its outer diameter and forming an extension of the cylinder wall at its inner diameter whereby to separate the discharge and suction passages at all times and to guide the safety head during movement thereof to relieve excess pressures within the cylinder, said safety head also including a rounded, mushroom-shaped member extending axially into the cylinder space and said piston being provided with a concavity closely receiving said member at the end of the compression stroke, and a spider connecting said mushroom-shaped member to said guiding portion and forming therewith a discharge valve seat.

CHARLES R. NEESON.